United States Patent [19]

Marolda

[11] Patent Number: 4,907,972

[45] Date of Patent: Mar. 13, 1990

[54] BABY WALKING STRAPS

[76] Inventor: Frank Marolda, 744 Inverrary La., Deerfield, Ill. 60015

[21] Appl. No.: 215,785

[22] Filed: Jul. 6, 1988

[51] Int. Cl.[4] .............................................. G09B 19/00
[52] U.S. Cl. ...................................... 434/255; 272/126
[58] Field of Search ......................... 272/902, 126, 74; 434/255

[56] References Cited

U.S. PATENT DOCUMENTS 2,108,566  2/1938  Sanders ............................... 434/255

FOREIGN PATENT DOCUMENTS 356572  7/1922  Fed. Rep. of Germany ...... 272/126
2308752  9/1973  Fed. Rep. of Germany ...... 272/902
1519711  2/1968  France .................................. 272/126
10840  of 1908  United Kingdom ................. 272/126

*Primary Examiner*—Edward M. Coven
*Assistant Examiner*—Valerie Szczepanik
*Attorney, Agent, or Firm*—Cushman, Darby & Cushman

[57] ABSTRACT

A pair of baby walking straps are disclosed for assisting an infant's first steps. Each baby walking strap has a loop at a first end thereof for placement about the wrist of an adult or for being manually gripped by the adult and second ends which include crossbar elements for the infant to grip in each hand. With such a structure, the baby can be supported and guided with the straps without the adult having to bend forwardly and stress his lower back.

6 Claims, 1 Drawing Sheet

BABY WALKING STRAPS

BACKGROUND OF THE INVENTION

The present invention relates to a device for assisting an infant's first steps and, in particular, to a pair of straps for an adult to use in assisting an infant in learning how to walk.

When an infant is learning to take his first steps, typically an adult will take the infant's left hand in his right hand, take the infant's right hand in his left hand and, while bending over because of the infant's small size, will slowly step backwardly as the infant takes small steps forward. In this manner, the adult can support the hands of the infant so that the infant can lean against the adult's hands as needed to maintain his balance as those first uncertain steps are taken and so that the adult can guide the infant. This age-old method of teaching an infant to walk, however, is not well suited to the adult's physical well-being. Indeed, because of the small size of the infant as compared to the adult, the adult must lean forward during the teaching process and thus a great deal of strain is placed upon the adult's lower back.

It would therefore be desirable to provide a means for assisting an infant's first steps by providing a guide and support for the child's arms while preserving the comfort and well-being of the adult's lower back.

SUMMARY OF THE INVENTION

The present invention provides a means for assisting an infant's first steps while preserving the comfort and the muscular well-being of the adult's lower back. In order to achieve this object, the present invention provides first and second straps which act as an extension of the adult's arms. The straps each have a loop at the first end thereof for placement in the hand or fitting over the hand and about the wrist of the adult. The opposite end of the strap is forked, for example, and includes a crossbar member which is sized so as to be comfortably gripped by the infant's hand. Thus, the infant through his natural gripping instinct will grip on to the crossbar of each strap and as the adult steps slowly rearwardly in a fully upright position, the infant can take his first steps while still being assisted through support afforded by the adult's grip on the strap.

Other objects, features and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENT

Figure 1:
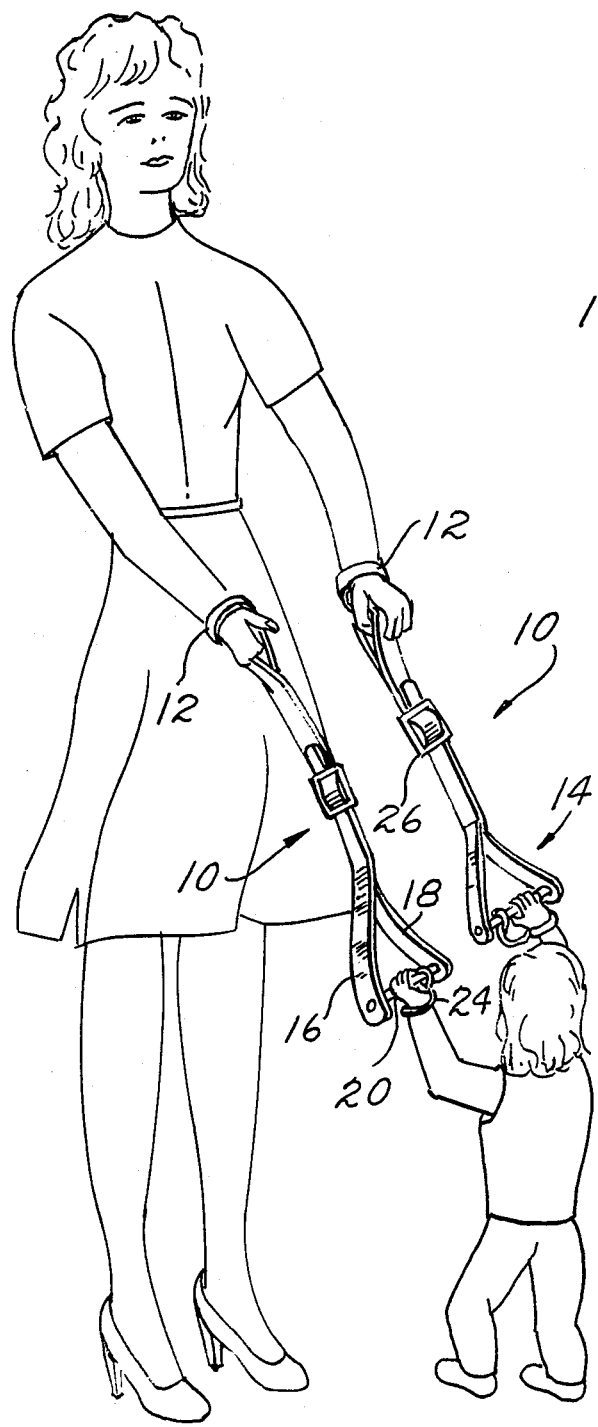
FIG. 1 is a perspective view showing an adult assisting an infant's first steps with straps formed in accordance with the present invention.
Figure 2:
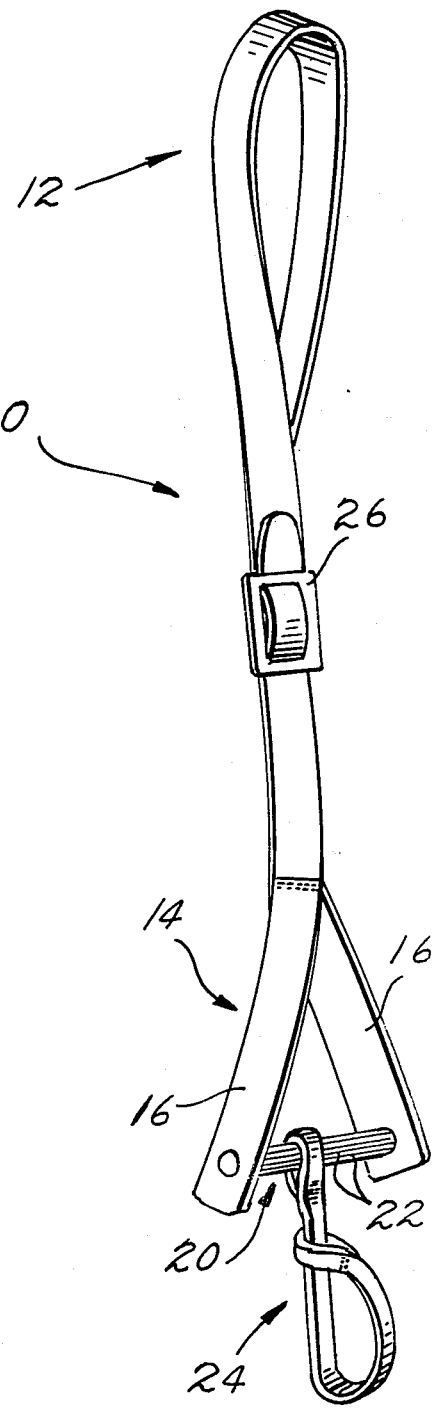
FIG. 2 is a top plan view of a strap formed in accordance with the present invention.

In FIG. 1, a pair of straps formed in accordance with the present invention is used, one in each hand, to assist the infant in learning to walk. As can be seen in FIG. 2, each strap 10 has, at a first longitudinal end thereof, a means for allowing an adult to firmly grasp the same. In the illustrated embodiment, a loop 12 is provided at the first end of the strap which can be placed in the hand of the adult or can be slid over the hand and thus securely retained about the wrist of the adult.

The opposite end of the strap 10 includes a means for allowing a baby to grasp the same with one hand. In the illustrated embodiment, the strap has a forked end 14 formed from first and second strap portions 16,18. A crossbar member 20 which can be easily grasped by the infant extends between the spaced apart ends of strap portions 16 and 18. In order to insure that the infant can firmly grasp the second end of the strap, in the preferred embodiment, the crossbar member 20 is formed from a rigid or semi-rigid material such as wood dowel or plastic dowel which provides a gripping member of predetermined size for the infant. Furthermore, the crossbar member 20 can have a tacky surface, ribs, grooves, undulations or the like, shown schematically at 22, which provides a frictional engagement surface to minimize the likelihood that the infant's hand will slip on the crossbar member 20.

As can be further seen in FIG. 2, in accordance with a most preferred embodiment, a safety strap 24 is coupled to the baby walking strap 10 and is adapted to be secured about the wrist of the infant. Thus, should the infant loose his grip on the crossbar 20, the safety strap 24 will ensure that the infant does not fall and injure himself. Such a safety strap is advantageous because, since the adult is in a fully upright position, there is a possibility that the infant could loose his grip and fall before the adult could catch him.

As a further feature of this invention, a means for adjusting the length of the baby walking strap is provided along the main body of the strap. In the illustrated embodiment, a buckle-type adjustment device 26 is provided. In the alternative, other length adjustment devices generally known for adjusting strap lengths could be provided such as a sliding length adjuster.

The baby walking strap 10 formed in accordance with the present invention can be made of any desired material, for example, leather or nylon. It is preferred that the main body of the strap be formed from a flexible material as providing a flexible strap enables easy and compact storage of the same and will minimize the likelihood that the infant, should he fall into the strap, would be injured.

While the invention has been described in connection with what is presently considered to be the most preferred embodiment, it is to be understood that other, equivalent structures could be provided without departing from the spirit and scope of the present invention as outlined in the appended claims.

What is claimed is:

1. A system for assisting a baby's first steps comprising:

first and second elongated flexible strap members each having first and second longitudinal ends;

first loop means at a first longitudinal end of each said strap member for allowing an individual to manually grasp and support said strap member, said first loop means being defined by a portion of respective strap member that has been turned and fastened to the remainder of the strap;

second loop means defined at said second longitudinal end of each said strap member for allowing an infant to manually grasp said second longitudinal end of said strap member, said second loop means being defined by a flexible fork-shaped strap element formed from the material provided for each said member and a rigid crossbar member coupled to and mounted to extend across an open end of said fork-shaped strap element; and at least one of said strap members further comprising a safety strap element fixedly coupled at one end thereof to one of said flexible fork-shaped element and said rigid cross bar member at said second longitudinal end of said respective strap member and including means for coupling to a wrist of an infant, whereby when an infant grasps said second end of each said strap member in each hand and an individual grasps said first end of each strap member in each hand, the infant can be guided and assisted in taking steps while the individual is in a fully upright position.

2. A baby walking strap system as set forth in claim 1 wherein each said strap member includes means for adjusting the length of said strap member.

3. A system as in claim 2, wherein said adjusting means comprises a buckle and said strap member is formed from first and second portions which are buckled together so as to define a strap member having an adjustable length.

4. A system as in claim 1, wherein said crossbar member has a roughened surface so as to facilitate manual gripping of the same.

5. A system as in claim 4, wherein said roughened surface includes a plurality of ribs.

6. A system as in claim 1, wherein said safety strap element includes a loop which is slidably adjustable in circumference so as to be tightenable about the infant's wrist.

* * * * *